March 10, 1942.    K. R. HERMAN ET AL    2,275,963
VALVE FOR POWER TRANSMISSION
Filed May 19, 1939    2 Sheets-Sheet 1
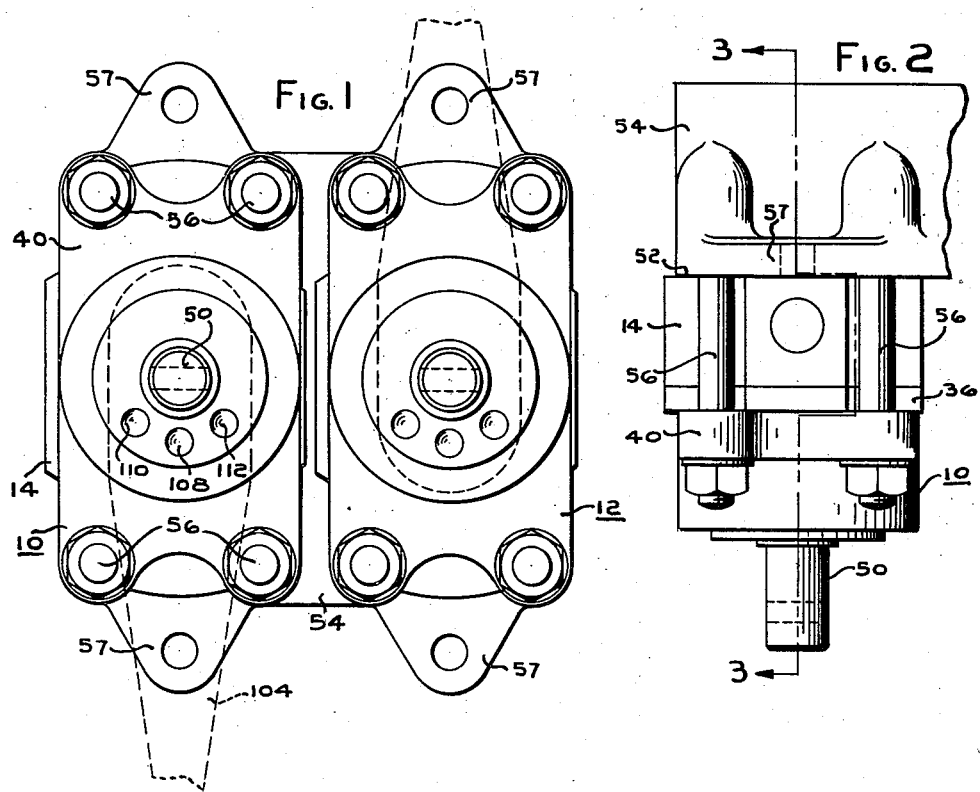
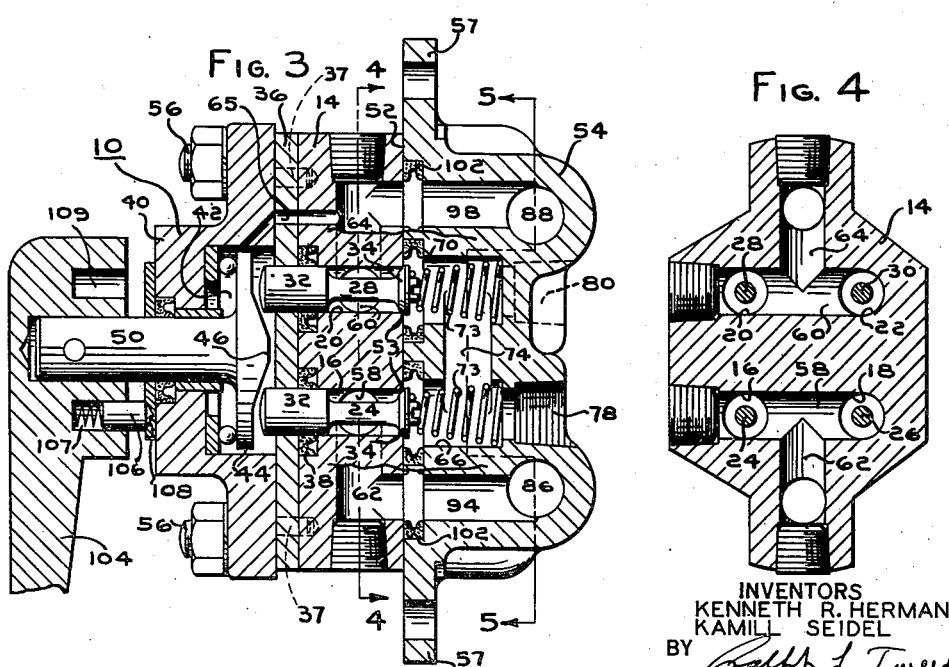
INVENTORS
KENNETH R. HERMAN &
KAMILL SEIDEL
BY
ATTORNEY March 10, 1942. K. R. HERMAN ET AL 2,275,963
VALVE FOR POWER TRANSMISSION
Filed May 19, 1939   2 Sheets-Sheet 2
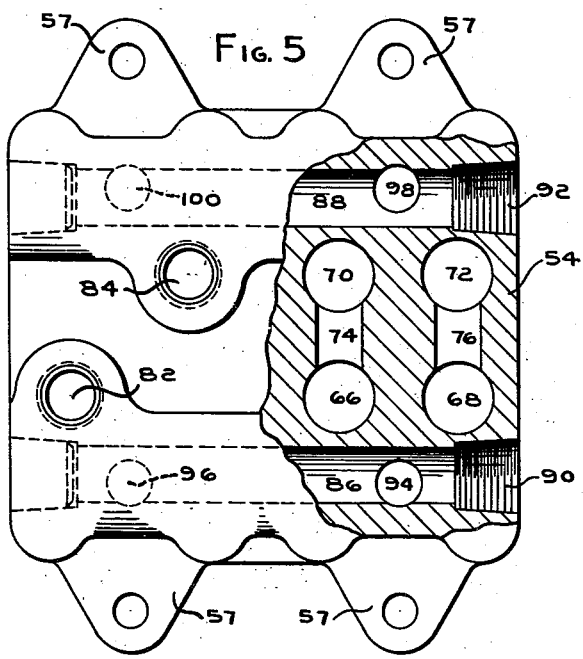
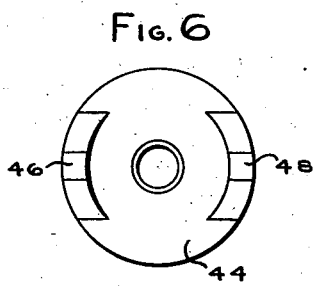
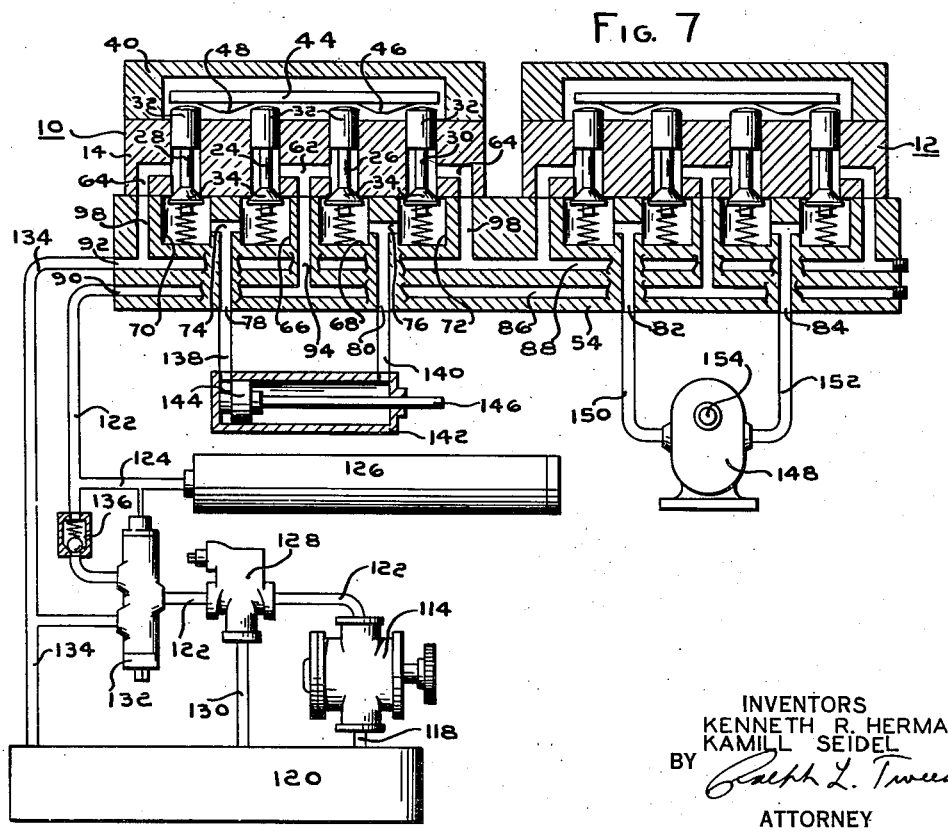
INVENTORS
KENNETH R. HERMAN &
KAMILL SEIDEL
BY Ralph L. Tweedale
ATTORNEY Patented Mar. 10, 1942

2,275,963

UNITED STATES PATENT OFFICE 2,275,963

VALVE FOR POWER TRANSMISSION

Kenneth R. Herman and Kamill Seidel, Detroit, Mich., assignors to Vickers Incorporated, Detroit, Mich., a corporation of Michigan Application May 19, 1939, Serial No. 274,572

4 Claims. (Cl. 277—20)

This invention relates to valves for power transmissions, particularly to those of the type comprising two or more fluid pressure energy translating devices one of which may function as a pump and another as a fluid motor.

In transmissions of this type it is common to use directional valves to direct the pump delivery to either one side of the motor or the other, thereby causing forward or reverse movement of the same. In many cases it is often desirable or necessary to use one pump to supply pressure fluid to two or more motors and at the same time have complete control over each. Heretofore systems of this type have used comparatively complicated piping and entailed much labor in the assembly and disassembly of the directional valves. Another difficulty usually encountered in such systems is the problem of leakage of fluid at certain points in the valves.

It is an object of the present invention to provide a fluid directional device capable of operating a plurality of fluid motors independent of each other from a single source of fluid pressure.

It is another object to provide a fluid directional device consisting of a plurality of unitary directional valves mounted on a common manifold that provides for all fluid connections thereto.

Another object is to provide means whereby the valve members of each valve are held seated by pressure in the cylinder or motor lines.

Another object is to provide valve members that are balanced in respect to the fluid pressure existing in the pressure line, thereby preventing movement of the valve members in response to said pressure.

Still another object is to so design the fluid directional device that leakage will be held to a minimum.

Further objects and advantages of the present invention will be apparent from the following description, reference being had to the accompanying drawings wherein a preferred form of the present invention is clearly shown.

In the drawings:

Figure 1 is a front elevation of a preferred form of the present invention showing two unitary valves.

Figure 2 is a fragmentary plan view of the device shown in Figure 1.

Figure 3 is a section taken on line 3—3 of Figure 2.

Figure 4 is a section taken on line 4—4 of Figure 3.

Figure 5 is a view partly in section taken on line 5—5 of Figure 3.

Figure 6 is an end view of the cam device shown in Figure 3.

Figure 7 is a diagrammatic view showing the hydraulic connections of the device shown in Figure 1.

Referring to the drawings, two unitary directional valves are generally indicated at 10 and 12. As the valves are identical only one will be described. A main body 14, of valve 10, has therein four parallel valve bores 16, 18, 20 and 22 equally spaced about a common point, as shown in Figure 4, and extending through the body. Slidably mounted in these bores are respective valve members 24, 26, 28 and 30. Each valve member has at one end an enlarged piston portion 32 and at the other end an enlarged beveled valve portion 34.

A plate 36, having holes therein registering with the valve bores 16, 18, 20 and 22 fits over the valve members 24, 26, 28 and 30 and serves to hold oil seals 38 in place. Plate 36 is accurately positioned by dowels 37 so that the holes therein may be finished concurrently with the valve bores to support pistons 32. Placed against plate 36 is an end cap 40 which has a cup-like hollow 42 encasing the projecting piston portions 32 of the valve members. A round cam plate 44, in hollow 42, has formed thereon two diametrically opposed cam portions 46 and 48 adapted to actuate the valve members as will later be described. Integrally formed with the plate 44 and extending through the cap 40 is a control shaft 50.

The valve body has a plane surface 52 into which the valve bores 16, 18, 20 and 22 open. Where these valve bores open into surface 52, the junction of the two surfaces forms a valve seat 53 on which valve portions 34 of valve members 24, 26, 28 and 30 are seated. The valve seats 53 may be ground very accurately and with little difficulty as they are formed automatically by grinding flat the plane surface 52 and by grinding cylindrically the bores 16, 18, 20 and 22. The valve 10 is mounted with its surface 52 upon a manifold 54 by bolts 56. It will be noted that the bolts 56 pass through the end cap 40 and into the manifold 54, sandwiching the plate 36 and body 14 therebetween. The manifold 54 has flanges 57 for mounting the same on brackets or on other suitable mounting.

In body 14, the bores 16 and 18 and bores 20 and 22 are connected by drilled passageways 58 and 60 respectively. Extending from passageways 58 and 60 respectively and opening into surface 52 are drilled passageways 62 and 64. An extension 65 of passage 64 connects with chamber 42 to provide a supply of oil for lubrication of cam 46 and to drain seepage past packings 38.

Formed in manifold 54 are four chambers 66, 68, 70 and 72. These chambers serve to enclose the valve seats 53 of valve bores 16, 18, 20 and 22 respectively. It will be understood that there are four such chambers in the manifold 54 for every valve mounted thereon. Mounted in each chamber is a spring 73 holding the valve members 24, 26, 28 and 30 seated. The chambers 66 and 70 and chambers 68 and 72 are connected together by passageways 74 and 76 respectively. Chambers 66 and 72 open into cylinder ports 78 and 80 in the rear of the manifold similar to two cylinder ports 82 and 84 of valve 12.

Extending through the entire length of the manifold 54 are two drilled passageways 86 and 88 adapted to be connected to pressure and tank lines respectively by ports 90 and 92 at one end of the manifold. The other ends of the passageways 86 and 88 are plugged. The pressure passage 86 has extending therefrom a drilled passageway 94 that registers with the passageway 62, in block 14, where it opens into surface 52. The manifold 54 has one such passageway as 94 for every valve that is mounted thereon. A passageway 96 serves valve 12 as 94 does valve 10. The tank passageway 88 has extending therefrom a drilled passageway 98 that registers with the passageway 64, in block 14, where it opens into surface 52. There is also one such passageway as 98 for every valve that is mounted on manifold 54. A passageway 100 serves valve 12 as 98 does valve 10.

Oils seals 102 are provided in manifold 54 wherever there are openings registering with block 14.

A lever 104 (Figure 3) is fastened on shaft 50 by which the cam plate 44 may be turned. A suitable spring detent 106 in lever 104 is adapted to engage in one of three indentations 108, 110 or 112 in cap 40. Adjacent valves may have their levers at 180-degree displacements for clearance purposes, and for this purpose each lever may have two holes 107 and 109 in either of which the detent 106 may be received.

When the lever is in the central position shown, with detent 106 in the indentation 108, the valve is in neutral position. When shifted clockwise the valve is in forward position and when shifted counterclockwise it is in reverse position.

Referring to Figure 7, there is shown diagrammatically the valves 10 and 12 and their manifold 54 incorporated in a typical hydraulic circuit. A pump 114 is adapted to be driven from a suitable prime mover, in the case of aircraft usually the propelling engine, it being understood that any other suitable prime mover may be used. Pump 114 has a suction conduit 118 through which it draws fluid from a tank 120 to deliver through a conduit 122 to the pressure port 90 in manifold 54. A branch conduit 124 connects the conduit 122 to an accumulator 126.

A relief valve 128 in conduit 122 is adapted to by-pass fluid to tank through a conduit 130 if pressure in conduit 122 exceeds a predetermined setting. A conventional unloading valve 132, in conduit 122, is adapted to unload the pump 114 by passing its full delivery to tank through a conduit 134 in response to pressure in the accumulator 126 when the latter has become fully charged. A check valve 136 is placed in conduit 122 between the conduit 124 and the unloading valve 132 and permits free flow from the pump to the accumulator 126. The conduit 134 also connects port 92 of manifold 54 to tank 120.

The cylinder ports 78 and 80 of manifold 54 are connected by conduits 138 and 140 to the head and rod ends respectively of a cylinder 142. Mounted in cylinder 142 is a piston 144 carrying a rod 146. The piston rod may be connected to any suitable load device which it is desired to reciprocate at will. Frequently in aircraft service the load device may be of the type which imposes a constant bias on the piston tending to return it to one end or the other, and the present valve is particularly suited to such service as well as to loads of the type which stay put when moved to any position.

A gear motor 148 has its two ports connected by conduits 150 and 152 respectively to the cylinder ports 82 and 84 of manifold 54. A drive shaft 154 of the gear motor may be connected to any suitable load requiring a rotary motion.

In operation, with the parts in the position shown in the drawings and the pump 114 operating, fluid is drawn from tank 120 through conduit 118 and delivered by conduit 122 and through valves 128, 132 and 136 to the pressure port 90 and passageway 86 of manifold 54. Pressure fluid is also delivered by branch conduit 124 to the accumulator 126 wherein it is stored. When accumulator 126 becomes fully charged the pressure responsive unloading valve 132 will shift to unload the pump. Accordingly pressure is maintained in passageway 86 of manifold 54 by the accumulator 126. The passageways 94 and 62 of valve 10 direct fluid pressure to valve members 24 and 26 where it is blocked, as the valve portions 34 of the members are seated. Pressure fluid in passageway 62 cannot move the valve members 24 or 26 because the inside effective areas offered by piston portion 32 and valve portion 34 are equal. The valve members are positively held seated by springs 73 and by cylinder pressure existing in chambers 66 and 70 and if the load is of the constant bias type. Because of the accurately ground valve seats, the balanced areas of members 24, 26, 28 and 30 offered to the pressure line, and the combined spring and cylinder pressures holding the valve members seated, pressure fluid leakage may be reduced to a negligible quantity. In devices constructed in accordance with the present invention, tests have shown leakage to be as low as two drops of fluid in twenty-four hours.

In Figure 7 the cam plate 44 is shown diagrammatically, but it will be understood that a back and forth motion in this view will correspond to the actual rotary motion of the plate.

If the lever 104 is revolved to engage detent 106 in indentation 112, cam 46 will contact piston portion 32 of valve 24 and move its valve portion 34 off of its seat 53. Cam 48 will do the same with valve member 30. When valve 24 opens, pressure fluid will be delivered from passageway 62 to chamber 66 and from thereby passageway 74, cylinder port 78 and conduit 138 to the head end of cylinder 142. Accordingly piston 144 will move to the right carrying its rod 146 to perform the work. Exhaust fluid from cylinder 142 passes to tank through conduit 140, port 80, passageway 76, chamber 72, the open valve 30, passageways 64, 98 and 88, tank port 92 and conduit 134. By revolving the lever 104 in the opposite direction until detent 108 engages indentation 110, cams 46 and 48 will open valves 26 and 28 respectively. Valve members 24 and 30 will close under the bias of springs 73. Pressure fluid will be directed from passageway 62 through open valve 28, chamber 68, passageway 76, cylinder port 80 and conduit 140 to the rod end of cylinder 142. Piston 144 and rod 146 will accordingly move to the left. Exhaust fluid passes to tank from cylinder 142 through conduit 138, port 78, passageway 74, chamber 70, open valve 28, passageways 64, 96 and 88, tank port 92 and conduit 134.

The valve 12 controls the gear motor 148 in the same manner.

It will be seen that a manifold such as 54 may be constructed to have mounted thereon any number of valves similar to 10 and 12. Each valve may be operated independently because each has its own passageways connecting to the pressure passageway 86 and the tank passageway 88. All pipe connections are made to the manifold thereby allowing removal of any of the valves mounted thereon by simply removing the four bolts 56. The removal of these bolts also completely disassembles the valve enabling quick inspection, repair, or replacement of parts. This feature is particularly desirable in aircraft service where regulations and high standards of maintenance require frequent inspection of the working parts of the entire craft.

While the form of embodiment of the invention as herein disclosed constitutes a preferred form, it is to be understood that other forms might be adopted, all coming within the scope of the claims which follow.

What is claimed is as follows:

1. A directional control valve for selectively directing pressure fluid between a motor conduit and supply and exhaust conduits respectively comprising in combination a multi-part body two parts of which are provided with abutting flat faces, one of said parts being formed with a plurality of uniform diameter bores perpendicular to and opening into said flat face, a supply port opening into one of said bores and an exhaust port opening into another of said bores, a motor port in the other of said body parts and having portions lying opposite the ends of both said bores, slidable valve members in said bores each valve having a poppet head adapted to seat on the one body part at the juncture of the corresponding bore with said flat face and having a balancing piston closely fitting the bore beyond the respective supply and exhaust ports, and means for operating said valve members to selectively unseat either one or the other.

2. A directional control valve for selectively directing pressure fluid between a pair of motor conduits and supply and exhaust conduits respectively comprising in combination a multi-part body two parts of which are provided with abutting flat faces, one of said parts being formed with a plurality of uniform diameter bores perpendicular to and opening into said flat face, a supply port opening into two of said bores and and exhaust port opening into two other of said bores, a pair of motor ports in the other of said body parts each having portions lying opposite the ends of two of said bores, slidable valve members in said bores each valve having a poppet head adapted to seat on the one body part at the juncture of the corresponding bore with said flat face and having a balancing piston closely fitting the bore beyond the respective supply and exhaust ports, and means for operating said valve members to selectively unseat either one or the other valve member at each motor port.

3. A directional control valve for selectively directing pressure fluid between a motor conduit and supply and exhaust conduits respectively comprising in combination a body having separate supply and exhaust valves of the poppet type each serving the same motor conduit, both the supply and exhaust valves having their heads exposed to pressure in the motor conduit in a direction tending to seat the valves, means for hydraulically balancing the supply valve with respect to supply pressure, and means for operating the valves selectively to open either one valve or the other valve.

4. A directional control valve for selectively directing pressure fluid between a motor conduit and supply and exhaust conduits respectively comprising in combination a body having separate supply and exhaust valves of the poppet type each serving the same motor conduit, both the supply and exhaust valves having their heads exposed to pressure in the motor conduit in a direction tending to seat the valves, means for balancing the supply valve with respect to supply pressure, and means for operating the valve selectively to open either one valve or the other valve, said body being formed of at least two parts, one part carrying the poppet valves and having supply and exhaust ports for said valves, the other part forming a mounting base and having a motor port, and conduit connections for the supply, exhaust and motor conduits, and means forming passages extending between the two body parts and serving to connect the supply and exhaust ports in the one part with the supply and exhaust conduit connections in the other part.

KENNETH R. HERMAN
KAMILL SEIDEL.